INVENTOR.
S. J. MURRAY
BY Young + Zingg
ATTORNEYS

United States Patent Office 3,255,105
Patented June 7, 1966

3,255,105
NATURAL GASOLINE RECOVERY PROCESS
CONTROL METHOD
Stephen J. Murray, Phillips, Tex., assignor to Phillips
Petroleum Company, a corporation of Delaware
Filed Dec. 10, 1962, Ser. No. 243,224
16 Claims. (Cl. 208—341)

This invention relates to an improved method of and apparatus for controlling a natural gasoline recovery process wherein primary control resides in controlling the composition of the residue gas.

A conventional natural gasoline recovery process operated to produce a residue gas of a desired composition employs an absorption step wherein lean oil absorbs the natural gasoline from a raw natural gas feed. Natural gasoline is recovered from the rich oil by a distillation step and the stripped lean oil then recycles to the absorption step. The recovered natural gasoline is then stabilized. Control of a conventional natural gasoline recovery process resides primarily in controlling the composition of the rich oil stream from the absorber and the composition of the natural gasoline recovered from the stabilizing step.

I have discovered an improved method of and apparatus for controlling a natural gasoline recovery process wherein the control of said natural gasoline recovery process resides primarily in controlling the composition of the residue gas stream formed by combining the absorber overhead residue gas and at least part of the rejected hydrocarbons from the stabilizing step.

Accordingly, an object of my invention is to provide an improved method of and apparatus for controlling a natural gasoline recovery process.

Another object of my invention is to provide an improved method of and apparatus for controlling a natural gasoline recovery process wherein primary control resides in controlling the composition of the residue gas.

Another object of my invention is to provide an improved method of and apparatus for controlling a natural gasoline recovery process whereby a residue gas having a desired heating value is obtained.

Another object of my invention is to provide an improved method of and apparatus for controlling the blending of residual gaseous streams.

Other objects, advantages and features of my invention will be readily apparent to those skilled in the art from the following description and the appended claims.

The inventive method of controlling a natural gasoline recovery process is based upon predicting the composition of the combined residual gaseous products from the absorption and stabilizing steps. As a result of this prediction, the rate of flow of enriching residue gas from the stabilizing step is adjusted. By employing the inventive predictive method of control, the effect of process dead time is substantially eliminated. Dead time in a process can be defined as the time lapse between initiation of a change in the process and detection of the effect of the change in the products of the process.

The effect of process dead time is readily apparent when, for example, it is assumed that it is desirous to produce a residue gas having a constant heating value. If operating conditions are such that the temperature of the lean oil feed is suddenly lowered, and a conventional feed-back control method is employed, a period of time passes before the effect of this change is noted in the residue gas product stream. Adjusting the flow of lean oil to the absorption step in response to this noted change will not return the heating value of the residue gas to the desired value until the dead time of the process has elapsed. By at least approximately predicting the change in the heating value of the residue gas which will result from a measured change in lean oil temperature, the effect of process dead time can be substantially reduced and such improved regulation of the heating value of the gas attained.

The inventive control method by which a residue gas of a desired composition is produced will hereinafter be discussed specifically as applied to the control of a natural gasoline recovery process so as to produce a residue gas of controlled heating value although it is not intended that the inventive method of control should be limited thereto.

I have discovered that the heating value of a residual gaseous product in the absorption step of a natural gasoline recovery process is a function of the gas-to-oil ratio, the temperature of the lean oil feed to the absorption step, and also the temperature of the rich oil at the completion of the absorption step. I have further discovered that when this absorber residue gas is combined with an enrichment gas from a gasoline stabilization step to produce a residual gaseous blend of substantially constant heating value that the heating value of this blend can be accurately predicted by an equation of the general form:

(1)
$$\text{B.t.u./c.f. of blend} = a + b \left(\frac{\text{absorber gas rate}}{\text{absorber oil rate}}\right) + c \text{ (rich oil temperature)} + d \left(\frac{\text{gas rate from stabilizer}}{\text{flow rate of gas blend}}\right) + e \text{ (rate of lean oil temperature change)}$$

where $a$, $b$, $c$, $d$, and $e$ are constants.

In a conventional natural gasoline recovery plant, absorber oil is circulated at a fixed rate. Equation 1 thus becomes:

(2)
$$\text{B.t.u./c.f. of blend} = a + b' \text{ (absorber gas rate)} + c \text{ (rich oil temperature)} + d \left(\frac{\text{gas rate from stabilizer}}{\text{flow rate of gas blend}}\right) + e \text{ (rate of lean oil temperature change)}$$

Also, in a conventional natural gasoline recovery plant the flow of residue gas from the absorber is in a reasonably constant ratio to the total flow rate of the residual gas blend. This reduces the number of measurements involved and changes Equation 2 to:

(3)
$$\text{B.t.u./c.f. of blend} = a + b'' \text{ (flow rate of gas blend)} + c \text{ (rich oil temperature)} + d \left(\frac{\text{gas rate from stabilizer}}{\text{Flow rate of gas blend}}\right) + e \text{ (rate of lean oil temperature change)}$$

The value of the constants in Equation 2 can be determined for the particular process by recording a number of steady state and dynamic observations (including BTU determinations of the blended residual gas) at various operating conditions, then inserting these observations in Equation 2 and solving as simultaneous algebraic equations. The method of determining these constants is discussed on page C–29 of Petroleum Engineer, January, 1960, issue, published by the Petroleum Engineer Publishing Company.

The foregoing discovery can be utilized in a predictive control system to control the B.t.u. content of a blended residude gas at a specified value. Measurement signals representing the process variables cited in Equation 2 are passed to a computer. Therein is automatically computed the blended gas heating value by the method of Equation 2. The computer output signal (computed value) is used to manipulate the flow of gas from the stabilization step so as to hold constant the heating value of the blended residue gas. The control system is predictive as it computes from process input information and controls therefrom to compensate for process changes before a heating valve change is noted in the residue gas blend.

Figure 1:
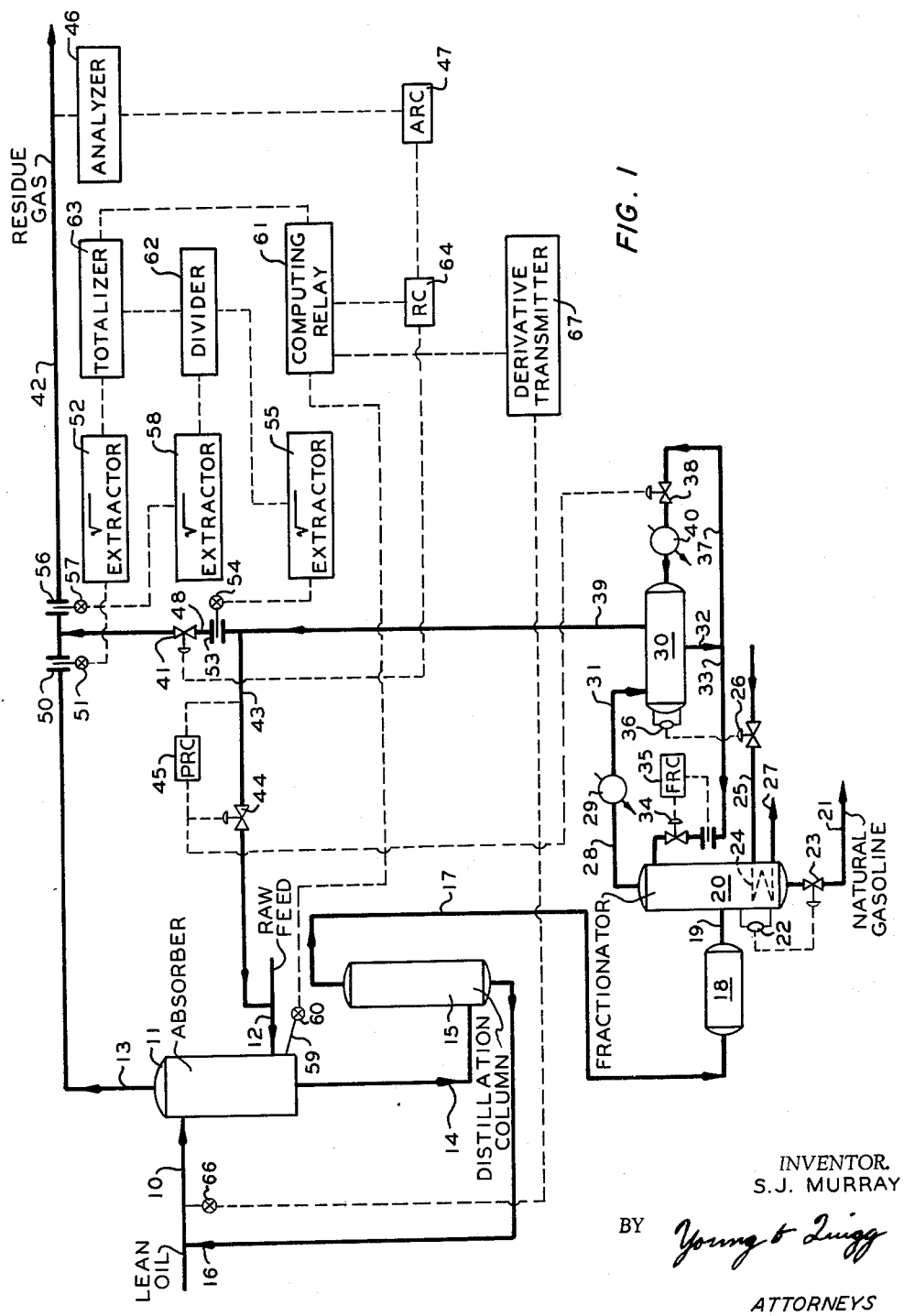
FIGURE 1 is a schematic representation of one embodiment of the inventive control method.

Referring to FIGURE 1, lean oil is passed to an absorber 11 by means of a conduit 10. Although one absorber is herein illustrated, it is within the scope of this invention to employ a plurality of absorbers. The raw natural gas feed is passed to absorber 11 by means of a conduit 12. A residual gaseous stream is withdrawn from absorber 11 by means of a conduit 13. A rich oil stream is withdrawn from absorber 11 via conduit 14 and passed to a means for stripping the absorbed natural gasoline product from the absorption oil, such as a distillation column 15.

A lean oil stream is withdrawn from the bottom of distillation column 15 and recycled to conduit 10 via conduit 16. An overhead product stream containing natural gasoline is withdrawn from distillation column 15 and passed to a surge vessel 18 via conduit 17.

A natural gasoline feed stream is passed from surge vessel 18 to a means for stabilizing said natural gas feed, such as a fractionator 20, via conduit 19. In said fractionator 20, the natural gasoline feed is deethanized, or otherwise stabilized, and the natural gasoline product withdrawn from fractionator 20 via conduit 21. The rate of natural gasoline product withdrawal can be controlled, for example, by liquid level controller 22 opening or closing valve 23. A reboiling temperature is maintained within fractionator 20 by a heat exchange means 24. A heat exchange medium is passed to said heat exchange means 24 via conduit 25, control valve 26 and withdrawn from said heat exchange means 24 via conduit 27.

An overhead vapor stream is withdrawn from the top of fractionator 20 via conduit 28 and passed to heat exchange means 29. The vaporous stream is substantially condensed in heat exchange means 29 and the product stream passed from heat exchange means 29 to an accumulator 30 via conduit 31.

Condensed liquid is withdrawn from accumulator 30 via conduit 32 and a portion of said withdrawn condensed liquid recycled to the top of fractionator 20 via conduit 33 and control valve 34. The flow of reflux liquid to the top of fractionator 20 is controlled by a conventional flow-recorder-controller 35. The flow of heating medium through conduit 25 can be controlled by liquid level controller 36, opening or closing valve 26 in response to the liquid level within accumulator 30. Condensed liquid, as required, is withdrawn from accumulator 30 via conduit means 32 and passed by means of conduit 37 to a vaporizing means 40 and from vaporizing means 40 to accumulator 30. The quantity of material vaporized by heat exchange means 40 is controlled by a valve 38.

A vaporous stream is withdrawn from accumulator 30 via conduit 39 and combined with the residue gaseous stream flowing from absorber 11, with the point of contact referred to as a contact zone, and/or recycled via conduit 43 and valve 44 to absorber 11 where it is combined with the raw natural gas feed charge.

Conventionally a quantity of non-condensible vapors is passed with the vaporous natural gasoline product from the rich oil stripping step (distillation column 15) to the stabilizing step. These non-condensible vapors pass as overhead product from the stabilizing step to the accumulator 30. It is therefore desirable to provide a means of be removed from the accumulator as enriching residue gas or otherwise utilized when the flow of enriching residue gas from accumulator 30 is reduced below the rate of accumulation of non-condensible vapors in the accumulator 30. It is therefore desirable to provide a means of recycling these non-condensible vapors to absorber 11 during periods of low enriching residue gas flow rate.

The flow of recycle vaporous feed to absorber 11 through valve 44 is controlled by a means of measuring a property of said vaporous stream withdrawn from accumulator 30 which is representative of the accumulation thereof, such as a pressure-recorder-controller 45, said measuring and recording means acting in response to a pressure within conduit 43, conduit 39, or accumulator 30. Pressure-recorder-controller 45 also opens or closes valve 38 in response to said pressure determination.

The method of effectively predicting the heating value of the combined gaseous stream in conduit 42 will now be described. Conduit 13 is provided with a rate of flow sensing means such as an orifice 50 across which a pressure differential is developed. This differential pressure is transmitted by a conventional differential transmitter 51 to a square root extractor 52, or the like, which can be any commercially available instrument that provides a signal that is linear and directly proportional to a rate of flow such as, for example, a Sorteberg force bridge of the type described in U.S. Patent 2,643,055.

Conduit 48 is provided with a rate of flow sensing means such as an orifice 53 across which a pressure differential is developed. This differential pressure is transmitted by differential pressure transmitter 54 to a square root extractor 55 or the like. Conduit 42 is provided with a rate of flow sensing means such as an orifice 56 across which a pressure differential is developed. This differential pressure is transmitted by differential pressure transmitter 57 to a square root extractor 58. The functions of pressure transmitters 54 and 57 and square root extractors 55 and 58 are respectively identical to the functions of transmitter 51 and square root extractor 52.

The temperature of the rich oil in absorber 11 is measured by a temperature sensing means 59 and a signal representative of said measurement is transmitted via transmitter 60 to a computing relay 61. If, for example, the temperature sensing means employed is a thermocouple, and the computing relay is a pneumatic instrument, transmitter 60 can be any commercially available instrument which will transpose an electrical input signal into a pneumatic output signal such as a Brown Electronik Air-O-Line controller described in Brown Instrument Catalogue 1531.

As previously noted, the heating value of the residue gas is also dependent upon the temperature of the lean oil feed. A sudden and radical change in the lean oil temperature feed caused, for example, by a sudden shift in wind direction, bringing a sudden drop in temperature, will almost instantly be reflected in a sudden and radical change in the heating value of the residue gas being withdrawn from absorber 11. It therefore becomes desirable to provide a method of control that will automatically compensate for sudden temperature changes in the lean oil feed. When the temperature of the lean oil becomes constant and equilibrium conditions are attained in the absorber, it becomes desirable to provide a method of control that can withdraw the correction made for the change in lean oil temperature.

The temperature of the lean oil in conduit 10 is measured by a temperature sensing means and a signal representative of said measurement transmitted to a pure derivative transmitter 67 from a temperature sensing and transmitting means 66. An instrument capable of measuring a temperature and transmitting a signal representative of said temperature is the Taylor Temperature Transmitter manufactured by Taylor Instrument Company, Rochester, New York, and described in Bulletin 98156, May 1955.

Derivative transmitter 67 is an instrument having pure derivative action and capable of transmitting a signal representative of the time derivative of the lean oil temperature to computing relay 61 responsive to an input signal received from temperature sensing and transmitting means 66 representative of the lean oil temperature. An instrument capable of producing the desired derivative signal is the Moore Nullimatic M/F Relay Model 68VI3 illustrated in Moore Products Company Bulletin AD68, December 1955. The signal representative of $e$ (rate of lean oil temperature change) of Equation (2) and shaped by the derivative transmitter 67 is transmitted for the period of time required to eliminate process dead time with respect to changes in lean oil temperature and a zero output signal is then transmitted by derivative transmitter 67 until a subsequent change in the lean oil temperature occurs.

The signal transmitted by derivative transmitter 67 is reverse acting. For example, an increase in the temperature of the lean oil will result in a signal being transmitted by derivative transmitter 67 calling for a decrease in the flow of enrichment gas. When, as in this application, the transmitted signal is received as a negative input by computing relay 61, the signal transmitted by derivative transmitter 67 has a negative sign.

Square root extractors 52, 55 and 58 are instruments capable of extracting the square roots of the input variables and multiplying each result obtained by a constant. The constant inserted by calibration into square root extractor 52 is representative of the orifice coefficient multiplied by a value representative of the additive change in heating value of the residue gas in conduit 13 effected by the gas/oil ratio of the absorber 11, it being assumed that absorber oil is circulated at a fixed rate. The constant inserted into square root extractor 55 is representative of the orifice coefficient multiplied by a value representative of the average incremental heating value of the enrichment gas flowing in conduit 48 over the desired combined residual gaseous heating value. A constant is inserted into square root extractor 58 which is representative of the orifice coefficient for orifice 56.

An output signal representative of the enrichment heating value per unit time of the combined residual gaseous stream in conduit 42 due to the flowing residue gas in conduit 48 is transmitted from square root extractor 55 to a divider 62. An output signal is transmitted from square root extractor 58 to divider 62, said output signal representative of the total flow of the combined residual gaseous stream per unit time in conduit 42. Divider 62 is an instrument, such as a Sorteberg force bridge, capable of dividing one input variable by another input variable, and transmitting an output signal responsive thereto. With the output of square root extractor 55 divided by the output of square root extractor 58, divider 62 provides an output signal representative of the change in heating value of the combined residual gaseous stream in conduit 42 per unit volume due to the flow of enriching residue gas in conduit 48. Divider 62 transmits this output signal to a totalizer 63.

Totalizer 63 is an instrument, such as a Moore M/F Adding Relay manufactured by Moore Products Company, Philadelphia 24, Pennsylvania, and illustrated in Bulletin 631, which is capable of adding two input variables, and, in addition thereto, adding a bias to the total sum. Said bias is representative of the heating value of the residue gas in conduit 13 without correction for changes in the gas-to-oil ratio and/or changes in the enrichment residue gas flow rate. In addition to an input signal received from divider 62, an input signal is received from square root extractor 52 which is representative of the change in heating value of the residue gas in conduit 13 per unit volume due to a change in the gas-to-oil ratio in absorber 11. Totalizer 63 thus transmits an output signal to computing relay 61 which is representative of the heating value of the combined residual gaseous stream corrected for a change in the gas-to-oil ratio in absorber 11 and the flow of enrichment residue gas in conduit 48, said output signal representing $b'$ (absorber gas rate) $+d$ (gas rate from stabilizer/flow rate of gas blend) + bias portion of Equation 2.

The rich oil temperature input signal is transmitted to computing relay 61 and multiplied by a constant within computing relay 61 to produce a result which is representative of the $c$ (rich oil temperature) portion of Equation 2 and of the predicted heating value of the residue gas flowing from absorber 11 due to the rich oil temperature.

Computing relay 61 is an instrument, such as a Foxboro M58–1 computing relay manufactured by the Foxboro Company, Foxboro, Massachusetts, capable of solving the following equation:

$$\text{Output} = g(A-C) + B + \text{bias}$$

where A, B and C are input variables and $g$ is an adjustable gain. Gain $g$ of this relay represents the constants $c$ and $e$ in Equation 2. The output from temperature transmitter 60 is fed to input A. The output of derivative transmitter 67 is fed to input C, and the output of totalizer 63 is fed to input B. When the sum of the bias of totalizer 63 and the bias of computing relay 61 is set equal to constant $a$ of Equation 2, the output of computing relay 61 constitutes a solution of Equation 2, and is the predicted heating value of the blended residue gas flowing in conduit 42. This signal is transmitted to a predictive B.t.u.-recorder-controller 64, which in turn opens or closes valve 41 in response to said predicted heating value (B.t.u. content) and to a set point, to which adjustments are applied in a hereinafter described manner, so as to provide a combined residual gaseous stream having a desired heating value.

Analyzing means 46, such as a Cutler-Hammer calorimeter described in Cutler-Hammer Bulletin 99001, is employed to determine the heating value of the combined residual gaseous stream in conduit 42. Analyzing means 46 transmits a signal to a B.t.u.-recorder-controller 47 representative of the heating value. The output of recorder-controller 47 makes small adjustments in the set point of predictive B.t.u.-recorder-controller 64. These set point adjustments compensate for non-predicted variables such as slow changes in the molecular weight of the absorber oil. The set point changes are relatively infrequent and of small magnitude and do not require a rapid response of analyzer 46.

The inventive control system as illustrated in the drawing is capable of producing a combined residual gaseous stream in conduit 42 having a heating value equal to or above the heating value of the residue gas passing through conduit 13, with the upper heating value limit determined by the heating value of the enriching stream flowing through conduit 48.

Figure 2:
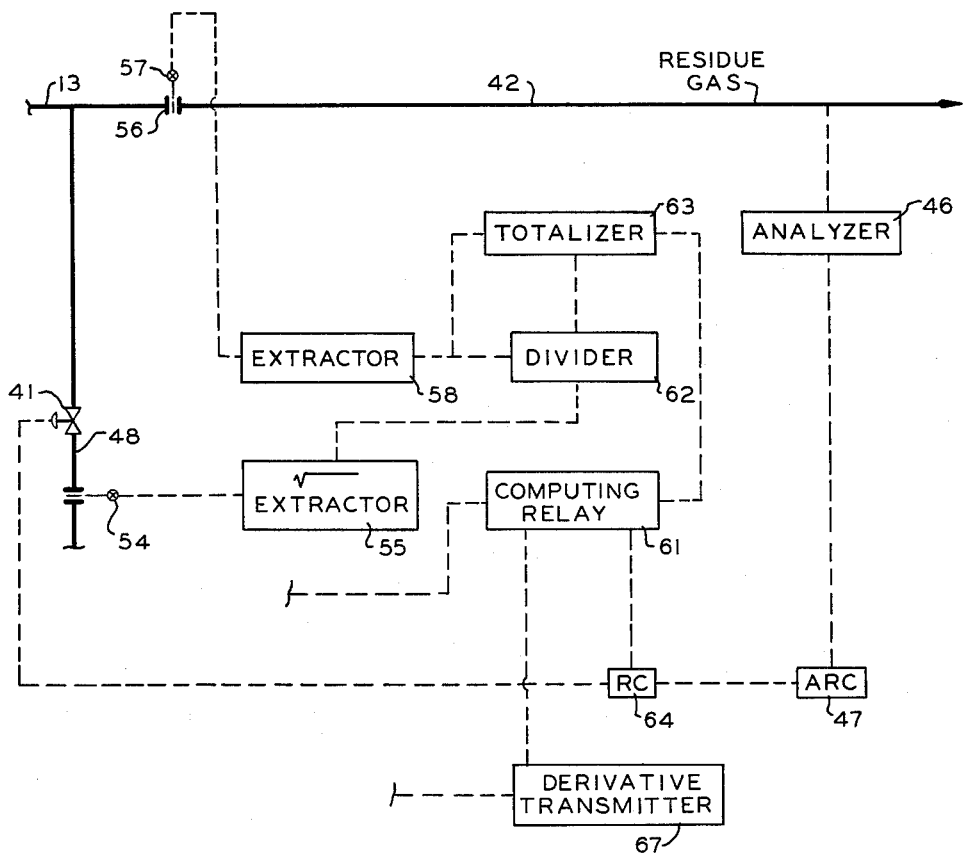
FIGURE 2 is a schematic representation of a second embodiment of the inventive control method.

If it is assumed that the flow of enrichment gas in conduit 48 will be relatively small or in constant ratio when compared to the flow of residue gas in conduit 13, the inventive control method illustrated in FIGURE 2 can be employed. In this modification, the predictive portion of the control system operates to solve Equation 3. Only that portion of the control system of FIGURE 1 required to illustrate this second embodiment is shown. The same numbers are employed in FIGURES 1 and 2 to illustrate those portions of the apparatus performing like functions. It is noted that only four measurements are now involved in computing the predicted heating value of the combined residual gaseous stream in conduit 42. The rate of flow as determined by orifice 56 is transmitted to square root extractor 58. Square root extractor 58 transmits a signal to both totalizer 63 and divider 62. The adjustable multiplying constant inserted in square root extractor 58 is set to represent $b''$, referring to Equation 3. The adjustable multiplying constant inserted in square root extractor 55 is set to represent $(b'')(d)$, again referring to Equation 3. The output of divider 62 is:

$$\frac{(b'')(d) \text{ (gas rate from stabilizer)}}{(b'') \text{ (flow rate of gas blend)}} = d \frac{\text{gas rate from stabilizer}}{\text{flow rate of gas blend}}$$

The remainder of the apparatus of FIGURE 2 functions as previously described in the discussion of FIGURE 1.

It is, of course, within the scope of this invention to employ pneumatic and/or electronic control instruments in the inventive control system as either type of instrument is readily adaptable to the inventive method of control.

Although the inventive control system has herein been illustrated in terms of controlling the heating value of a combined residue gas, it is not intended that the invention should be limited thereto. As is well known by those skilled in the art, the measurement of a heating value of a residue gas from a natural gasoline recovery process is also representative of the composition of said residue gas. The heating value of the residue gas is equal to the sum of the individual heating values of the individual components, each of said individual heating values being equal to the specific heating value of the individual component multiplied by the percent concentration of the component in the residue gas. Therefore, it is clear that the inventive control system also provides a means for controlling a natural gasoline recovery process so as to provide a residue gas of controlled composition.

The inventive control system provides an efficient method of controlling a natural gasoline recovery process by predicting a future residue gas composition or heating value resulting from a change in lean oil temperature, rich oil temperature, gas throughput, or enrichment flow. This prediction is necessary due to time lag in the absorber, distillation column, fractionator, and fluid transportation means. An early prediction enables the control system to add enrichment vapor at the proper time and in the proper amount to maintain a residual gaseous stream of constant composition or heating value.

The control system has a built-in rate or derivative action. When it is desired, for example, to increase the heating value of the combined residual gaseous stream because of a sudden drop in the lean oil temperature, the enrichment flow will be temporarily high to offset the increased absorption in the absorption zone. As previously noted, the effect upon the control system caused by the drop in the lean oil temperature will be withdrawn after a specified period of time as the resulting incremental increase in absorption at the absorber works through the distillation column, surge vessel and fractionator and stepwise adjustments are made in the control system compensating for the drop in lean oil temperature, continuing to produce a combined residue gas of constant heating value or composition. Further, while analog computing is performed using available automatic control components of the general category of relays, force bridges et al., the use of also available electronic process analog computers such as the TR-12 computer manufactured by Electronic Associates, Inc., Long Branch, New Jersey, is also within the scope of this invention. The computing may also be performed by digital techniques such as by a digital differential analyzer or a general purpose digital computer. In this latter instance, the computing facility may be time-shared among other computing and/or data logging duties, performing the automatic control functions in a discontinuous rather than a continuous fashion.

As will be evident to those skilled in the art, various modifications of this invention can be made, or followed, in the light of the foregoing disclosure and discussion without departing from the spirit or scope thereof.

I claim:

1. In a natural gasoline recovery process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline product, and withdrawing from said stabilization zone a second residue gas; a method of control which comprises combining said first residue gas with said second residue gas in a contact zone, measuring a property of the absorption oil passed to said absorption zone which is representative of a temperature of said absorption oil and a first effect upon the impending composition of said combined residue gas, measuring a property of said rich oil which is representative of a temperature of said rich oil and a second effect upon the impending composition of said combined residue gas, measuring a property of the combined residue gas which is representative of a rate of flow of said combined residue gas and a third effect upon the impending composition of said combined residue gas, measuring a property of said second residue gas which is representative of a rate of flow of said second residue gas and a fourth effect upon the impending composition of said combined residue gas, combining said first, second, third and fourth effects to produce a value representative of said impending composition, manipulating the flow of said second residue gas to said contact zone in response to said value, measuring a property of said combined residue gas which is representative of the composition thereof, and further manipulating the flow of said second residue gas to said contact zone in response to said measured property of said combined residue gas.

2. In a natural gasoline recovery process which comprises contacting a natural gas feed with an absorption oil in an absorption zone, withdrawing from said absorption zone a first residue gas, passing a rich oil from said absorption zone to a separation zone, withdrawing absorption oil from said separation zone, passing a natural gasoline containing stream from said separation zone to a stabilization zone, withdrawing from said stabilization zone a stabilized natural gasoline product, and withdrawing from said stabilization zone a second residue gas; a method of control which comprises passing at least a portion of said second residue gas to said absorption zone, combining said first residue gas with the remainder of said second residue gas in a contact zone, measuring a property of the absorption oil passed to said absorption zone which is representative of a temperature of said absorption oil and a first effect upon the impending composition of said combined residue gas, measuring a property of said rich oil which is representative of a temperature of said rich oil and a second effect upon the impending composition of said combined residue gas, measuring a property of said combined residue gas which is representative of a rate of flow of said combined residue gas and a third effect upon said impending composition of said combined residue gas, measuring a property of said second residue gas which is representative of a rate of flow of said second residue gas and a fourth effect upon said impending composition of said combined residue gas, combining said first, second, third and fourth effects to produce a value representative of said impending composition, manipulating the rate of flow of said second residue gas to said contact zone in response to said value, measuring a property of said combined residue gas which is representative of the composition thereof, and further manipulating the flow of said second residue gas to said contact zone in response to said measured property of said combined residue gas representative of the composition thereof.

3. The method of control of claim 2 to include measuring a property of said second residue gas which is representative of the pressure thereof, and manipulating the rate of flow of said second residue gas to said absorption zone in response to said measured property of said second residue gas representative of the pressure thereof.

4. In a natural gasoline recovery process which comprises contacting a natural gas feed with an absorption oil in an absorption zone, withdrawing from said absorption zone a first residue gas, passing a rich oil from said absorption zone to a separation zone, withdrawing absorption oil from said separation zone, passing a natural gasoline containing stream from said separation zone to a stabilization zone, withdrawing from said stabilization zone a stabilized natural gasoline product, and withdrawing from said stabilization zone a second residue gas; a method of control which comprises passing at least a portion of said second residue gas to said absorption zone, combining said first residue gas with the remainder of said second residue gas in a contact zone, measuring a property of the absorption oil passed to said absorption zone which is representative of a temperature of said absorption oil and a first effect upon the impending composition of said combined residue gas, measuring a property of said rich oil which is representative of a temperature of said rich oil and a second effect upon the impending composition of said combined residue gas, measuring a property of said first residue gas which is representative of a rate of flow of said first residue gas and a third effect upon said impending composition of said combined residue gas, measuring a property of said second residue gas which is representative of a rate of flow of said second residue gas and a fourth effect upon said impending composition of said combined residue gas, measuring a property of said combined residue gas which is representative of a rate of flow of said combined residue gas and a fifth effect upon said impending composition of said combined residue gas, combining said first, second, third, fourth and fifth effects to produce a value representative of said impending composition, manipulating the rate of flow of said second residue gas to said contact zone in response to said value, measuring a property of said combined residue gas which is representative of the composition thereof, and further manipulating the flow of said second residue gas to said contact zone in response to said measured property of said combined residue gas representative of the composition thereof.

5. The method of control of claim 4 to include measuring a property of said second residue gas which is representative of the pressure thereof, and manipulating the rate of flow of said second residue gas to said absorption zone in response to said measured property of said second residue gas representative of the pressure thereof.

6. In a natural gasoline recovery process which comprises contacting a natural gas feed with an absorption oil in an absorption zone, withdrawing from said absorption zone a first residue gas, passing a rich oil from said absorption zone to a separation zone, withdrawing absorption oil from said separation zone, passing a natural gasoline containing stream from said separation zone to a stabilization zone, withdrawing from said stabilization zone a stabilized natural gasoline product, and withdrawing from said stabilization zone a second residue gas; a method of control which comprises passing at least a portion of said second residue gas to said absorption zone, combining said first residue gas with the remainder of said second residue gas in a contact zone, measuring a property of the absorption oil passed to said absorption zone which is representative of a temperature of said absorption oil and a first effect upon the heating value of said combined residue gas, measuring a property of said rich oil which is representative of a temperature of said rich oil and a second effect upon the impending heating value of said combined residue gas, measuring a property of said first residue gas which is representative of a rate of flow of said first residue gas and a third effect upon said impending heating value of said combined residue gas, measuring a property of said second residue gas which is representative of a rate of flow of said second residue gas and a fourth effect upon said impending heating value of said combined residue gas, measuring a property of said combined residue gas which is representative of a rate of flow of said combined residue gas and a fifth effect upon said impending heating value of said combined residue gas, combining said first, second, third, fourth and fifth effects to produce a value representative of said impending heating value, manipulating the rate of flow of said second residue gas to said contact zone in response to said value, measuring a property of said combined residue gas which is representative of the heating value thereof, and further manipulating the flow of said second residue gas to said contact zone in response to said measured property of said combined residue gas representative of the heating value thereof.

7. In a natural gasoline recovery process which comprises contacting a natural gas feed with an absorption oil in an absorption zone, withdrawing from said absorption zone a first residue gas, passing a rich oil from said absorption zone to a separation zone, withdrawing natural gasoline from said separation zone, withdrawing absorption oil from said separation zone, passing said natural gasoline to a stabilization zone, withdrawing from said stabilization zone a stabilized natural gasoline product, and withdrawing from said stabilization zone a second residue gas; a method of control which comprises combining said first residue gas with said second residue gas in a contact zone, withdrawing said combined residue gas from said contact zone, measuring the temperature of the absorption oil passed to said absorption zone, transmitting a signal representative of the rate of absorption oil temperature change to a computing zone, measuring the temperature of said rich oil, transmitting a signal representative of said rich oil temperature measurement to said computing zone, measuring the rate of flow of said combined residue gas from said contact zone, transmitting a signal representative of said rate of flow measurement to said computing zone, measuring the rate of flow of said second residue gas to said contact zone, transmitting a signal representative of said second residue gas rate of flow measurement to said computing zone, said computing zone solving the equation $$\text{Impending heating value} = a + b \text{ (rate of flow of combined residue gas)} \\ + c \text{ (rich oil temperature)} \\ + d \left( \frac{\text{rate of flow of second residue gas}}{\text{rate of flow of combined residue gas}} \right) \\ + e \text{ (rate of absorbtion oil temperature change)}$$

where $a$, $b$, $c$, $d$ and $e$ are constants, transmitting a signal from said computing zone representative of said impending heating value of the said combined residue gas to a means for controlling the rate of flow of said second residue gas to said contact zone, thereby manipulating the rate of flow of said second residue gas in response thereto, measuring a property of said withdrawn combined residue gas which is representative of the heating value thereof, and further manipulating the rate of flow of said second residue gas to said contact zone in response to said measured heating value of said combined residue gas.

8. In a natural gasoline recovery process which comprises contacting a natural gas feed with an absorption oil in an absorption zone, withdrawing from said absorption zone a first residue gas, passing a rich oil from said absorption zone to a separation zone, withdrawing absorption oil from said separation zone, passing a natural gasoline containing stream from said separation zone to a stabilization zone, withdrawing from said stabilization zone a stabilized natural gasoline product, and withdrawing from said stabilization zone a second residue gas; a method of control which comprises passing at least a portion of said second residue gas to said absorption zone, combining said first residue gas with the remainder of said second residue gas in a contact zone, withdrawing a combined residue gas from said contact zone, measuring the temperature of the absorption oil passed to said absorption zone, transmitting a signal representative of the rate of absorption oil temperature change to a computing zone, measuring the temperature of said rich oil, transmitting a signal representative of said rich oil temperature measurement to said computing zone, measuring the rate of flow of said combined residue gas, passing a signal representative of said combined residue gas rate of flow measurement to said computing zone, measuring the rate of flow of said second residue gas to said contact zone, transmitting a signal representative of said second residue gas rate of flow measurement to said computing zone, said computing zone solving the equation $$\text{Impending heating value} = a + b \text{ (rate of flow of combined residue gas)}$$
$$+ c \text{ (rich oil temperature)}$$
$$+ d \left( \frac{\text{rate of flow of second residue gas}}{\text{rate of flow of combined residue gas}} \right)$$
$$+ e \text{ (rate of absorption oil temperature change)}$$

where $a$, $b$, $c$, $d$, and $e$ are constants, transmitting a signal from said computing zone representative of said impending heating value of said combined residue gas to a means of manipulating the rate of flow of said second residue gas to said contact zone, thereby manipulating the rate of flow of said second residue gas in response thereto, measuring a property of said combined residue gas which is representative of the heating value thereof, and further manipulating the rate of flow of said second residue gas to said contact zone in response to said measured heating value of said combined residue gas.

9. The method of control of claim 8 to include measuring a property of said second residue gas which is representative of the pressure thereof, and manipulating the rate of flow of said second residue gas to said absorption zone in response to said measured property of said second residue gas representative of the pressure thereof.

10. Apparatus comprising an absorption vessel, first conduit inlet means communicating with the upper region of said absorption vessel, second conduit inlet means communicating with the lower region of said absorption vessel, third conduit outlet means communicating with the top of said absorption vessel, a separation vessel, fourth conduit means communicating between the bottom of said absorption vessel and said separation vessel, fifth conduit outlet means communicating with the bottom of said separation vessel, a stabilizing vessel, sixth conduit outlet means communicating between the upper region of said separation vessel and said stabilizing vessel, seventh conduit outlet means communicating with the bottom of said stabilizing vessel, a condensing means, eighth conduit means communicating between the upper region of said stabilizing vessel and said condensing means, a storage vessel, ninth conduit means communicating between said condensing means and said storage vessel, tenth conduit means communicating between said storage vessel and said third conduit outlet means, a computing means, means for measuring the temperature of a fluid flowing through said first conduit means, means for transmitting a signal representative of the rate of change of said temperature to said computing means, means for measuring the liquid temperature in the bottom of said absorption vessel, means for transmitting a signal representative of said liquid temperature measurement to said computing means, means for measuring the rate of fluid flow through said tenth conduit outlet means, means for transmitting a signal representative of said rate of flow measurement to said computing means, means for measuring the rate of fluid flow through said third conduit outlet means downstream of the position where said tenth conduit means communicates with said third conduit outlet means, means for transurement through said third conduit outlet means to said computing means, control means for manipulating the rate puting means, control means for manipulating the rate of fluid flow through said tenth conduit means, means for transmitting a signal from said computing means to said control means, means for analyzing the flow through said third conduit outlet means downstream of said position where said tenth conduit outlet means communicates with said third conduit outlet means, and means for further manipulating the rate of flow through said tenth conduit outlet means in response to a signal transmitted from said analyzing means.

11. The apparatus of claim 10 to include means for measuring the rate of fluid flow through said third conduit outlet means upstream of the position where said tenth conduit means communicates with said third conduit outlet means, and means for transmitting a signal representative of said rate of flow measurement to said computing means.

12. The apparatus of claim 11 to include eleventh conduit means communicating between said tenth conduit means and said second conduit inlet means.

13. The apparatus of claim 12 to include means for measuring a pressure in said tenth conduit means and means for manipulating the rate of fluid flow through said eleventh conduit means responsive thereto.

14. In a natural gasoline recovery process which comprises contacting a natural gas feed with an absorption oil in an absorption zone, withdrawing from said absorption zone a first residue gas, passing a rich oil from said absorption zone to a separation zone, withdrawing absorption oil from said separation zone, passing a natural gasoline containing stream from said separation zone to a stabilization zone, withdrawing from said stabilization zone a stabilized natural gasoline product, and withdrawing from said stabilization zone a second residue gas; a method of control which comprises passing at least a portion of said second residue gas to said absorption zone, combining said first residue gas with the remainder of said second residue gas in a contact zone, withdrawing a combined residue gas from said contact zone, measuring a temperature of the absorption oil passed to said absorption zone, transmitting a signal representative of the rate of said temperature change to a computing zone, measuring a temperature of said rich oil, transmitting a signal representative of said rich oil temperature measurement to said computing zone, measuring a rate of flow of said combined residue gas, passing a signal representative of said combined residue gas rate of flow measurement to said computing zone, measuring a rate of flow of said second residue gas to said contact zone, transmitting a signal representative of said second residue gas rate of flow measurement to said computing zone, measuring a rate of flow of said first residue gas to said contact zone, transmitting a signal representative of said first residue gas rate of flow measurement to said computing zone, said computing zone solving the following equation:

$$\text{Impending heating value} = a + b \text{ (rate of flow of first residue gas)}$$
$$+ c \text{ (rich oil temperature)}$$
$$+ d \left( \frac{\text{rate of flow of second residue gas}}{\text{rate of flow of combined residue gas}} \right)$$
$$+ e \text{ (rate of absorption oil temperature change)}$$

where $a$, $b$, $c$, $d$, and $e$ are constants, transmitting a signal from said computing zone representative of said impending heating value of said combined residue gas to a means of manipulating the rate of flow of said second residue gas to said contact zone, thereby manipulating the rate of flow of said second residue gas in response thereto, measuring a property of said combined residue gas which is representative of the heating value thereof, and further manipulating the rate of flow of said second residue gas to said contact zone in response to said measured heating value of said combined residue gas.

15. The apparatus of claim 10 wherein said computing means is capable of solving the equation $$\text{Impending heating value} = a + b \text{ (said rate of flow through said third conduit means)}$$
$$+ c \text{ (said liquid temperature in the bottom of said absorption vessel)}$$
$$+ d \frac{\text{said rate of flow through said tenth conduit means}}{\text{said rate of flow through said third conduit means}}$$
$$+ e \text{ (said temperature of fluid flowing through said first conduit means)}$$

wherein $a$, $b$, $c$, $d$, and $e$ are constants, said means for transmitting a signal from said computing means to said control means comprises a means for transmitting a signal representative of said impending heating value, and said means for analyzing the flow through said third conduit outlet means downstream of said position where said tenth conduit outlet means communicates with said third conduit outlet means comprises means for determining the heating value of a fluid flowing through said third conduit outlet means.

16. The apparatus of claim 11 wherein said computing means is capable of solving the equation $$\text{Impending heating value} = a + b \text{ (rate of fluid flow through said third conduit outlet means upstream of the position where said tenth conduit means communicates with said third conduit outlet means)}$$
$$+ c \text{ (liquid temperature in the bottom of said absorption vessel)}$$
$$+ d \left( \frac{\text{rate of fluid flow through said tenth conduit means}}{\text{rate of flow through said third conduit means downstream of the position of communication between said tenth conduit means and said third conduit means}} \right)$$
$$+ e \text{ (rate of change of the temperature of a fluid flowing through said first conduit means)}$$

where $a$, $b$, $c$, $d$, and $e$ are constants, said means for transmitting a signal from said computing means to said control means comprises means for transmitting a signal representative of said impending heating value from said computing means to said control means, and said means for analyzing the flow through said third conduit outlet means downstream of said position where said tenth conduit outlet means communicates with said third conduit outlet means comprises means for determining the heating value of a fluid flowing through said third conduit outlet means.

References Cited by the Examiner

UNITED STATES PATENTS

| | | | |
|---|---|---|---|
| 2,547,970 | 4/1951 | Phillips et al. | 208—341 |
| 2,564,791 | 8/1951 | Ribble | 208—341 |
| 2,771,149 | 11/1956 | Miller et al. | 208—341 |

DELBERT E. GANTZ, *Primary Examiner.*

ALPHONSO D. SULLIVAN, *Examiner.*

P. P. GARVIN, H. LEVINE, *Assistant Examiners.*